June 23, 1959     H. C. SINGLE     2,892,082
SELECTIVE GATING SYSTEM
Filed Sept. 29, 1955
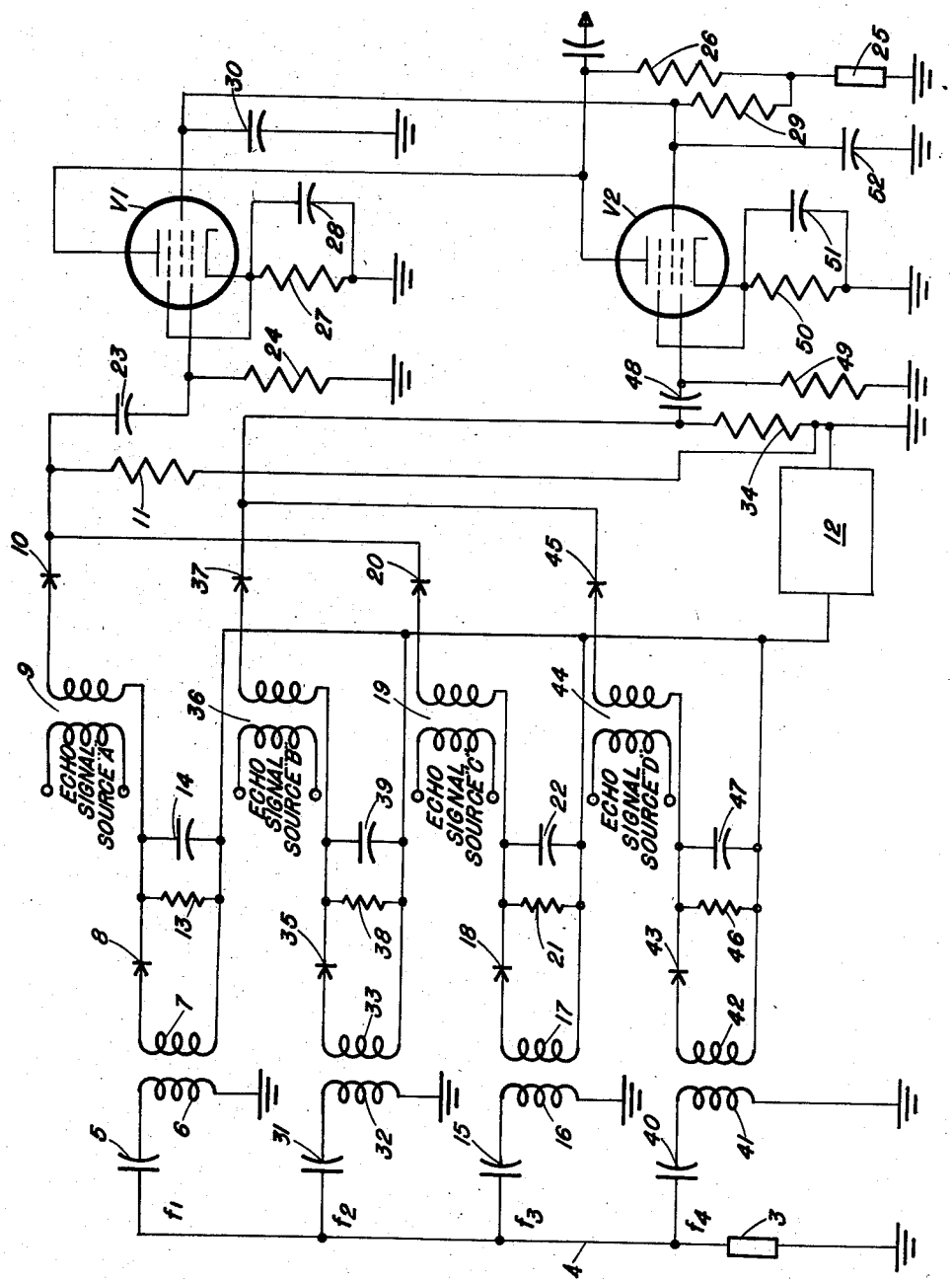
INVENTOR.
HERBERT C. SINGLE
BY
ATTORNEYS Patented June 23, 1959

2,892,082
SELECTIVE GATING SYSTEM

Herbert C. Single, Lexington, Mass., assignor, by mesne assignments, to the United States of America as represented by the Secretary of the Navy Application September 29, 1955, Serial No. 537,609

1 Claim. (Cl. 250—27)

The present invention relates to novel and improved sonar equipment and more particularly to novel and improved commutating apparatus for a sonar scanning system.

Resolution of a target in azimuth in various types of present sonar systems is ordinarily dependent upon the radiation of a plurality of beams which are formed by a suitable transducer and its associated circuits. The transducer and its associated equipment ordinarily consists of a plurality of energy transmitting units which are physically positioned in a predetermined configuration or pattern. As the energy of each of the transmitting units is radiated outwardly to the object or target and as the various echos therefrom are returned to the transducer, the phase, relative amplitude, and other characteristic information of each echo pulse must be methodically gathered and properly associated with the transmitting unit that originated that particular energy wave. Although commutation and scanning equipment for this purpose may have been designed and devised in the past, considerable difficulty has been had heretofore in providing such equipment which is relatively simple in construction and yet reliable and efficient in operation.

It is a principal object of the present invention to provide novel and improved commutation apparatus for a sonar scanning system.

It is a further object of the present invention to provide novel and improved apparatus for continuously and successively gathering and/or detecting the various echo pulses of a sonar transducer in an effective systematic manner.

Other objects and many of the attendant advantages of this invention will be readily appreciated as the same becomes better understood by reference to the following detailed description when considered in connection with the accompanying drawing wherein the figure is a schematic diagram of a preferred embodiment of the present invention.

A preferred embodiment of the present invention is illustrated in the figure of the drawing. As shown therein, the variable frequency generator source 3 is electrically connected by means of conductor 4 to the series resonant circuit that includes condenser 5 and inductor 6. The coil or the like 7 which is electrically coupled to the inductor 6 drives a circuit that extends through the crystal diode 8, the secondary winding of transformer 9, the crystal diode 10, load resistor 11, and the negative bias source 12. The RC smoothing filter circuit which includes resistor 13 and condenser 14 is preferably coupled as shown between the junction of crystal diode 8 and the secondary winding of transformer 9 and the junction of the coil 7 with bias source 12. Signal source A which is to be commutated is coupled in any suitable manner to the primary winding of transformer 9.

Generator source 3 and conductor 4 are also connected to the series resonant circuit of condenser 15 and inductor 16. Coil 17 is wound about inductor 16 and is coupled to the load resistor 11 and the negative bias source 12 by a circuit that includes in series the crystal diode 18, the secondary winding of transformer 19 and the crystal diode 20. The RC smoothing filter circuit which includes resistor 21 and condenser 22 is preferably connected as shown across the output of coil 17 and crystal diode 18. Signal source C which is to be commutated is coupled in any suitable manner to the primary winding of transformer 19.

The output circuit of load resistor 11 is coupled to the control grid of tube V-1 through condenser 23 and resistor 24. The plate circuit of tube V-1 extends from the positive 150 volt supply source 25 through load resistor 26, the tube, and the parallel circuit of resistor 27 and condenser 28 to ground. The suppressor grid of tube V-1 is preferably connected to its cathode as shown, and its screen grid is connected to supply source 25 through resistor 29 and is bypassed to ground through condenser 30.

The variable frequency generator source 3 is also electrically connected to the series resonant circuit that includes condenser 31 and inductor 32. The coil or the like 33 is wound about inductor 32 and is coupled to load resistor 34 and the negative bias source 12 by a circuit that includes in series the crystal diode 35, the secondary winding of transformer 36, and the crystal diode 37. The RC smoothing filter circuit which includes resistor 38 and condenser 39 is preferably connected as shown across the output of coil 33 and crystal diode 35. Signal source B which is to be commutated is coupled in any suitable manner to the primary winding of transformer 36.

Generator source 3 and conductor 4 are also connected to the series resonant circuit of condenser 40 and inductor 41. Coil 42 is wound about inductor 41 and is coupled to the load resistor 34 and the negative bias source 12 by a circuit that includes in series the crystal diode 43, the secondary winding of transformer 44, and the crystal diode 45. The RC smoothing filter circuit which includes resistor 46 and condenser 47 is preferably connected as shown across the output of coil 42 and crystal diode 43. Signal source D which is also to be commutated is coupled in any suitable manner to the primary winding of transformer 44.

The output circuit of load resistor 34 is coupled to the control grid of tube V-2 through condenser 48 and resistor 49. The plate circuit of tube V-2 extends from the positive 150 volt supply source 25 through load resistor 26, the tube, and the parallel circuit of resistor 50 and condenser 51 to ground. The suppressor grid of tube V-2 is preferably connected to its cathode as shown, and its screen grid is connected to supply source through resistor 29 and is bypassed to ground through condenser 52.

Thus, it is seen that all of the even numbered channels for the signal sources which are to be commutated are coupled to the common load resistor 11 and all the odd numbered channels are coupled to the common load resistor 34. The output of the even channels then feed the pentode V-1 and the output of the odd channels feed the pentode V-2. The outputs of pentodes V-1 and V-2 then drive the relatively small load resistor 26 such that true addition of the outputs of each pentode occurs. In this way as will be more apparent hereinafter flow of D.C. carrier current with its respective sonar echo signal superimposed thereon is prevented from interfering with and/or influencing the flow of carrier current in its adjacent channels.

As indicated in the figure of the drawing, each of the series resonant circuits which are coupled to variable generator 3 is tuned to the distinct discreet frequencies $f1$—$f4$ which are preferably within an octave of one another and are not harmonically related. Although for the sake of simplicity channels for only four discreet frequencies are shown and described herein, it is to be understood that any greater or smaller number of channels could be provided to correspond with a similar number of signal sources that are to be commutated without departing from the spirit or scope of the present invention.

Coils 7, 17, 33, and 42 which are respectively coupled to inductors 6, 16, 32 and 41 preferably have a number of turns that is inversely proportional to the Q of its associated series resonant circuit. This, it has been found, insures an equal output at resonance for each channel regardless of the individual Q's of the tuned circuits.

In operation as the frequency of generator 3 is swept up to the resonant frequency $f1$ of the circuit of condenser 5 and inductor 6, the voltage across inductor 6 builds up and produces an alternating voltage in the coil 7 coupled thereto. This alternating voltage is then rectified by crystal diode 8 and smoothed to D.C. by the filter network of resistor 13 and condenser 14. When this D.C. voltage becomes sufficiently greater than the negative potential of the bias source 12, a D.C. carrier current with the A.C. information of signal source A superimposed thereon is conducted from the upper terminal of coil 7 successively through crystal diode 8, the secondary winding of transformer 9, crystal diode 10, load resistor 11, and the bias source 12 back to the coil 7.

As the frequency of generator source 3 sweeps past the resonant range of the circuit of condenser 5 and inductor 6, the positive D.C. output of coil 7 and diode 8 decreases until once again the negative potential of the bias source 12 causes diode 10 to block the flow of current through resistor 11 and information from signal source A on transformer 9 is no longer available.

As the frequency of generator 3 is swept toward the resonant frequency $f2$ of the circuit of condenser 31 and inductor 32, the circuit which includes coil 33, crystal diode 35, the secondary winding of transformer 36, crystal diode 37, load resistor 34, and bias source 12 will then pass a D.C. current for the output of signal source B through load resistor 34.

A suitable D.C. carrier current is produced in a similar manner for signal sources C and D as the frequency of generator 3 successively passes through the resonant frequencies $f3$ and $f4$ of the tuned circuits of condenser 15 and inductor 16 and of condenser 40 and inductor 41. Generator 3 then starts its sweep operation all over again and the entire cycle described above is repeated.

As load resistors 11 and 34 are alternately energized, voltages therefrom are picked off, respectively amplified by pentodes V-1 and V-2 and combined in the common load resistor 26. The output voltage across resistor is then used by conventional sonar equipment to detect, resolve, and/or track echo signals which are picked up.

Obviously many modifications and variations of the present invention are possible in the light of the above teachings. It is therefore to be understood that within the scope of the appended claim the invention may be practiced otherwise than as specifically described.

What is claimed is:

Commutation apparatus for a plurality of signals comprising a variable frequency generator adapted to sweep over a predetermined frequency range; a series LC circuit for each signal, each LC circuit being connected in parallel with the variable frequency generator and tuned to resonance at progressively increased, predetermined, discreet frequencies within said frequency range; a bias voltage source; a pair of resistors; a circuit for each LC circuit coupled therewith to receive the output therefrom including in series a rectifier, signal source, and a diode, the series circuits coupled to alternate LC circuits being connected in parallel and in series with one of said resistors and said bias voltage source, the series circuits coupled to the outer LC circuits being connected in parallel and in series with the other of said resistors and said bias voltage source, said bias voltage normally preventing signal current flow and said rectifiers developing sufficient D.C. voltage at resonance of their LC circuit to overcome the bias voltage and conduct a signal through the circuit; an amplifier for each said resistor, the input circuit of each amplifier being coupled to its respective resistor; and a common load resistor coupled to the output of each amplifier.

References Cited in the file of this patent

UNITED STATES PATENTS

| | | |
|---|---|---|
| 1,922,059 | Ohl | Aug. 15, 1933 |
| 2,148,578 | Pullis | Feb. 28, 1939 |
| 2,414,123 | Retallack | Jan. 14, 1947 |
| 2,626,987 | Veaux | Jan. 27, 1953 |